United States Patent [19]

Yasukawa

[11] Patent Number: 4,616,397
[45] Date of Patent: Oct. 14, 1986

[54] MAGAZINE FOR REPLACEABLE TOOLS AND OPERATION METHOD OF INDEXING TOOLS USING THE MAGAZINE

[75] Inventor: Hiroshi Yasukawa, Niigata, Japan

[73] Assignee: Niigata Engineering Co., Ltd., Tokyo, Japan

[21] Appl. No.: 572,347

[22] Filed: Jan. 20, 1984

[51] Int. Cl.⁴ .......................................... B23Q 3/157
[52] U.S. Cl. ..................................... 29/568; 211/1.5
[58] Field of Search ............... 29/568, 26 A; 408/31, 408/35; 211/1.5

[56] References Cited

U.S. PATENT DOCUMENTS

| 3,546,774 | 12/1970 | Stoferle et al. | 408/35 |
| 3,662,442 | 5/1972 | Noa | 29/568 |
| 3,990,140 | 11/1976 | Polacek et al. | 29/568 |
| 4,344,221 | 8/1982 | Pagani | 29/568 |
| 4,402,125 | 9/1983 | Carroll et al. | 29/568 |

FOREIGN PATENT DOCUMENTS

| 2257577 | 7/1973 | Fed. Rep. of Germany | 29/568 |
| 2391028 | 1/1979 | France | 29/568 |
| 157422 | 12/1980 | Japan | 29/568 |
| 126033 | 7/1983 | Japan | 29/568 |
| 663535 | 5/1979 | U.S.S.R. | 29/568 |

Primary Examiner—Gil Weidenfeld
Assistant Examiner—Daniel W. Howell
Attorney, Agent, or Firm—Sughrue, Mion, Zinn, Macpeak & Seas

[57] ABSTRACT

A tool magazine for an automatic machine producing various machining operations with the aid of machine tools held by a machine spindle. The magazine for replaceable tool is adapted to hold a plurality of tools each in tool holding mechanisms being held on a tool pallet mounted on a rotary table of the automatic machine. The spindle cooperates with the magazine so as to be in alignment with a tool holding mechanism of the magazine at a tool replacement position; whereby a new tool can be withdrawn from the tool holding mechanisms by the spindle or a used tool held by the spindle can be inserted into the tool holding mechanism. In addition, the magazine is indexed, to align the several tool holding mechanisms, one at a time, with the spindle at the tool replacement position by transmitting spindle movement, preferably through a tool, to the magazine. The magazine may include a plurality of magazine units, each carrying several tool holding mechanisms on a supporter adapted for rotation about a shaft in response to defined spindle movement. Releasable lock mechanisms prevent non-commanded support rotation.

21 Claims, 5 Drawing Figures

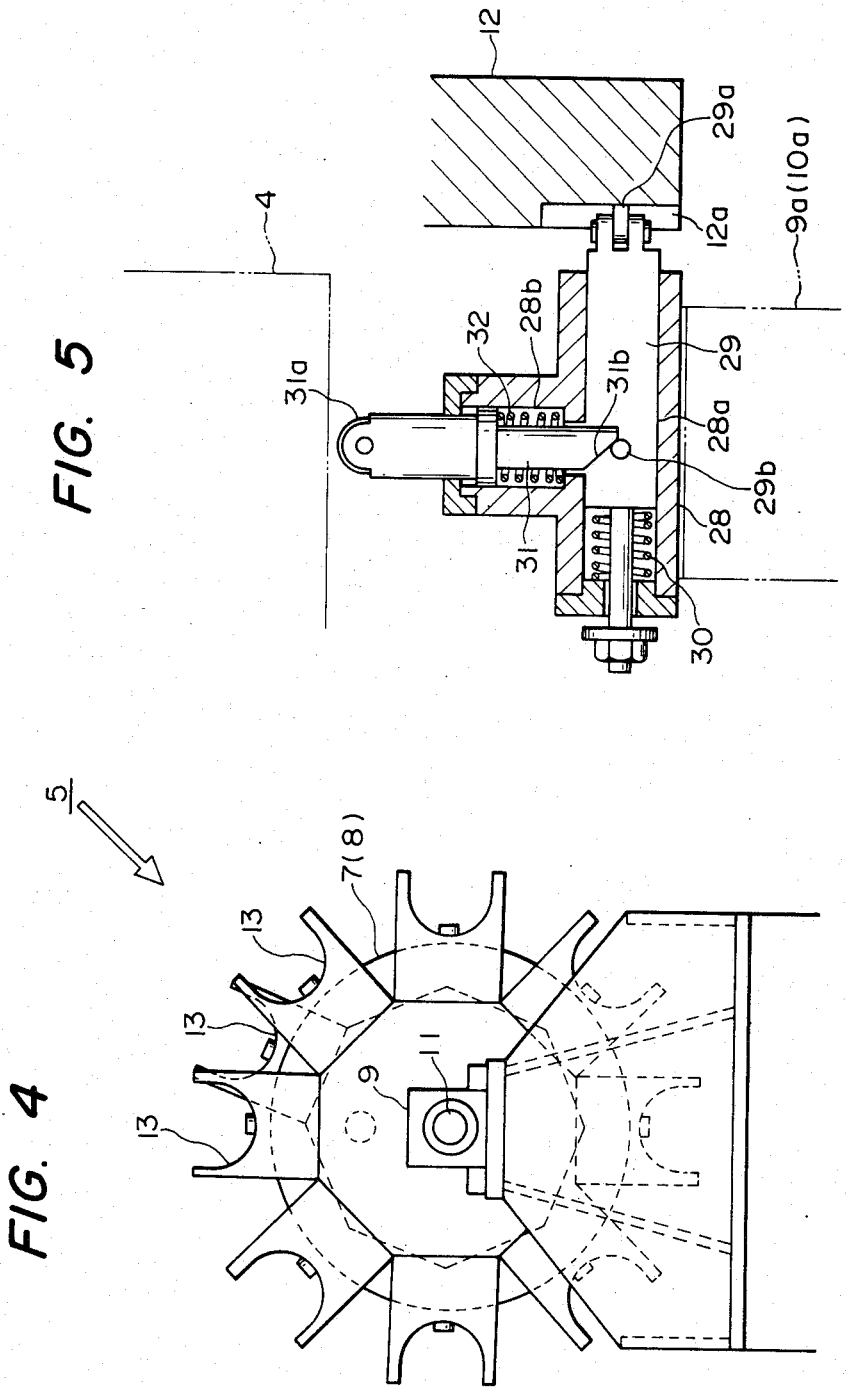

MAGAZINE FOR REPLACEABLE TOOLS AND OPERATION METHOD OF INDEXING TOOLS USING THE MAGAZINE

BACKGROUND OF THE INVENTION

The present invention relates to a magazine for replaceable tools used in an automatic machine tool.

The present invention further relates to a tool indexing method for positioning a tool mounted in the magazine into a predetermined position conveying the tool into the front of a machine tool.

Recently, flexible machining system (FMS) has been developed in which a number of juxtaposed machine tools with an automatic tool changing apparatus and other associated apparatus are totally controlled by a computer. In these systems it is necessary to replace tools used in those machine tools when they have been damaged or exhausted, or when an object to be worked is changed, thereby requiring new tools.

Conventionally, a tool is replaced by various methods. These methods include:

(a) Stopping of the machine tool to manually replace a tool.

(b) Using replaceable type tool magazine whereby both a tool together with its tool magazine are replaced by another tool and tool magazine.

(c) Changing a tool between tool magazine mounted on a machine tool and separately provided tool magazine.

The method (a) has the disadvantage that the availability of the machine tool is reduced because of the necessity to stop the machine for tool replacement. It is also disadvantageous in that it is impossible to have the system operate unattended because of the necessity for manual intervention during tool changing. Generally, the machine operates using both tools commonly used for various operations and tools used exclusively for particular operations. Therefore, the method (b) is disadvantageous in that, when these tools are received in one tool magazine, it is necessary to have the commonly used tools in every tool magazine thus making this method uneconomical because of an increase in numbers of tools. Further, it is necessary to provide various means (such as means for conveying the magazine and loading it into the machine tool, means for positioning, means for cramping, etc.), in addition to an ordinary tool changing apparatus, resulting in an increase in the cost of the machine and in the requirement for greater space. The method (c) is also disadvantageous in that it requires various means such as means for conveying and indexing the submagazine and means for loading a tool into the tool magazine mounted on the machine tool, resulting in increased cost and in the requirement for greater space, as with the case of method (b).

SUMMARY OF THE INVENTION

An object of the present invention is to provide an improved magazine for replaceable tools. The magazine includes a frame mounted on a tool pallet, and a pair of magazine units each comprising a supporter and a plurality of tool holding mechanisms supported on the outer peripheral portion of the supporter. The pair of magazine units are rotatably supported about a center shaft extending in the frame. The magazine units confront with each other with a predetermined distance therebetween in axial direction of the center shaft. The respective tool holding mechanism of one of the magazine units is offset by half a pitch in phase relative to respective tool holding mechanisms of the other magazine unit. Each of the tool holding mechanism holds the tool in such a manner that longitudinal axis of the tool extends in parallel with the axial direction of the center shaft. Further, each of the tool holding mechanism permits the tool to be inserted thereinto or released therefrom in a direction perpendicular to the axis of the center shaft. Furthermore, positioning mechanism is provided which is disposed between the magazine unit and the frame in order to position each of the tool holding mechanisms of each of the magazine units into a predetermined index position.

Another object of the present invention is to provide an operation method for indexing tools using the magazine. According to the method, tools are exchanged between a tool magazine mounted on a machine tool and a separately provided replaceable tool magazine. A tool is held by one of the tool holding mechanisms of the magazine and conveyed to the front of the machine tool. The tool is indexed into a predetermined position by moving the tool magazine by means of the actuation of a spindle of the machine tool, so that tools are indexed into predetermined positions, rapidly and accurately, without requiring any special tool indexing means to thereby solve problems of conventional machines.

BRIEF DESCRIPTION OF THE DRAWINGS

FIG. 4 is a schematic front view of a pair of magazine units; and

FIG. 5 is a cross-section of another fixing mechanism according to the invention.

DETAILED DESCRIPTION OF THE PREFERRED EMBODIMENTS

Figure 1:
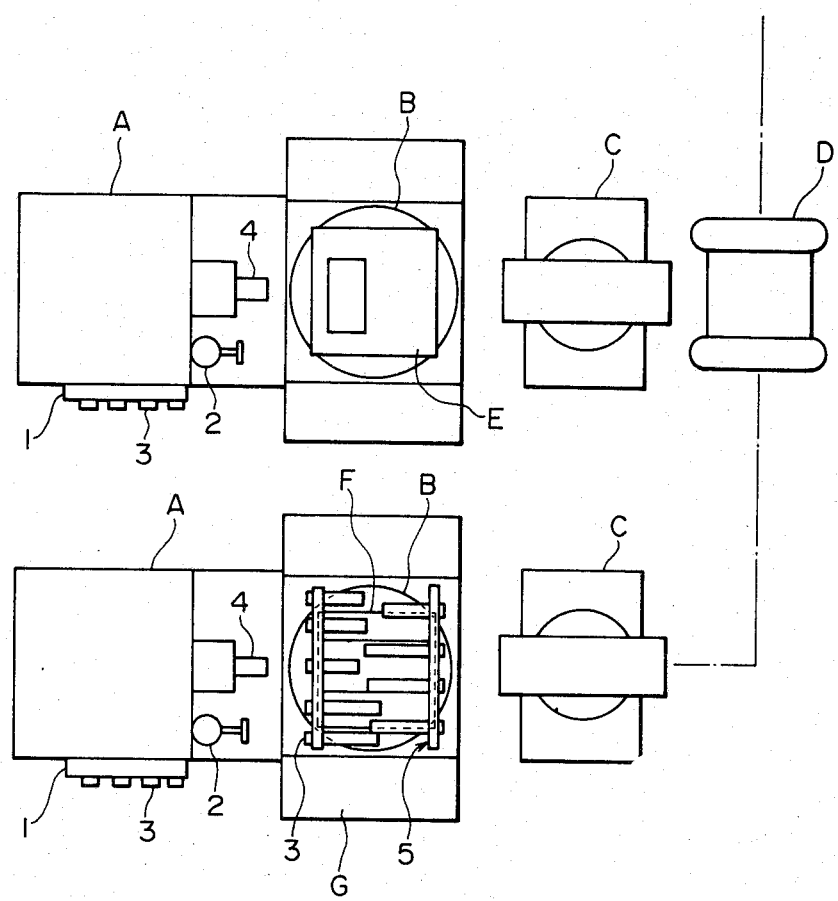
FIG. 1 is a schematic plan view showing the relation between the magazine for replaceable tools according to the present invention and a machine tool.

Referring to the drawings, the present invention will be described hereinafter.

FIG. 1 schematically illustrates a magazine 5 for replaceable tools according to the present invention and a plurality of juxtaposed machine tools. In FIG. 1 each machine tool A is provided with an ordinary tool magazine 1 and a tool changer 2 so that, using the tool changer 2, one tool 3 is removed from the magazine 1 and mounted onto a spindle 4. The tool 3 mounted on the spindle 4 may be removed therefrom and returned to the tool magazine 1 after it is used. An automatic pallet changer C is provided in front of a rotary table B of each of the machine tool A so that a work pallet E which has been conveyed thereto by a remotely controlled truck D or a tool pallet F on which a magazine 5 for replaceable tools according to the present invention is mounted, can be fed onto the rotary table B through the automatic pallet changer C. The machine tool A, the rotary table B, and the automatic pallet C may be conventional.

Figure 2:
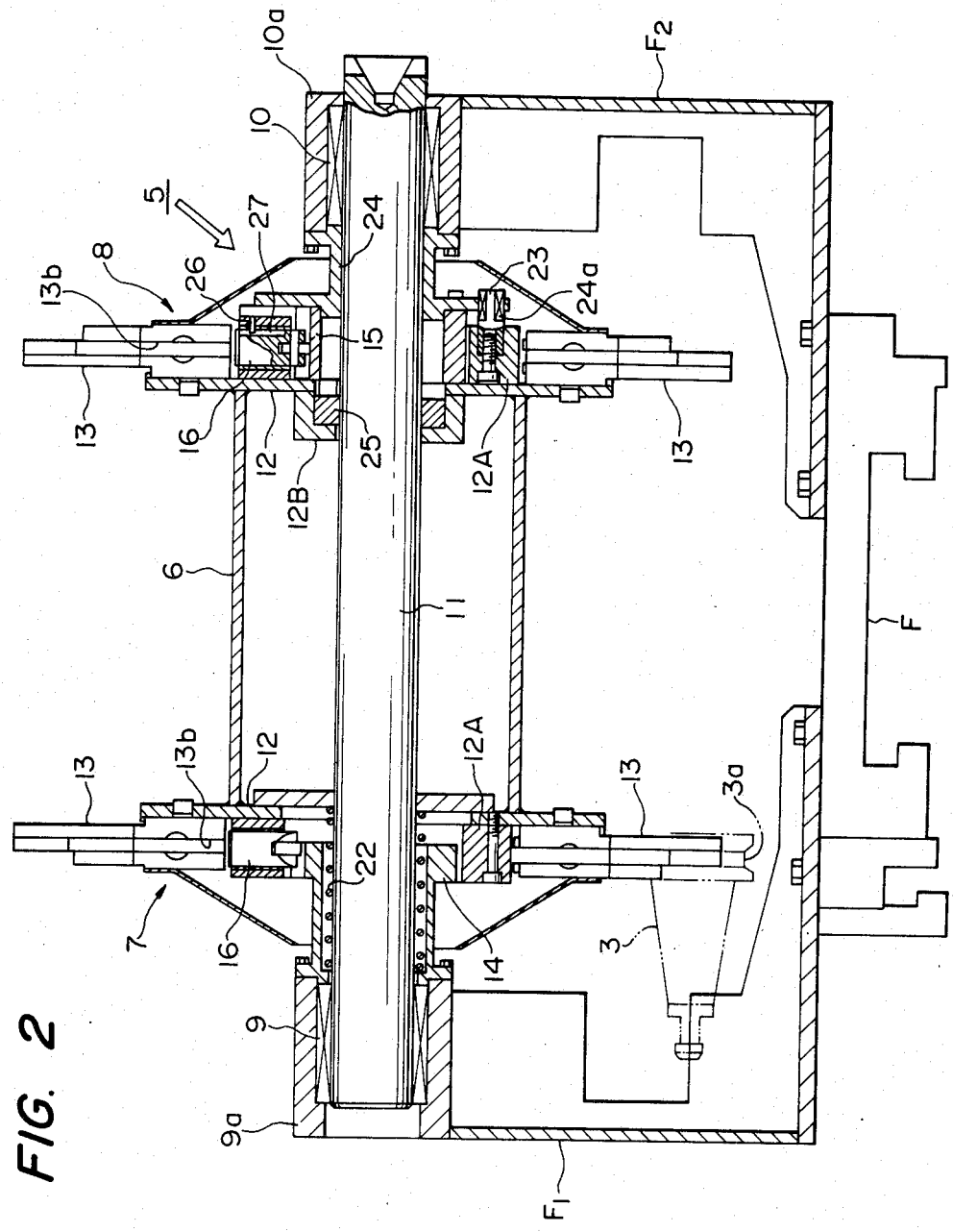
FIG. 2 is a cross-section of an embodiment of the magazine according to the present invention.
Figure 3:
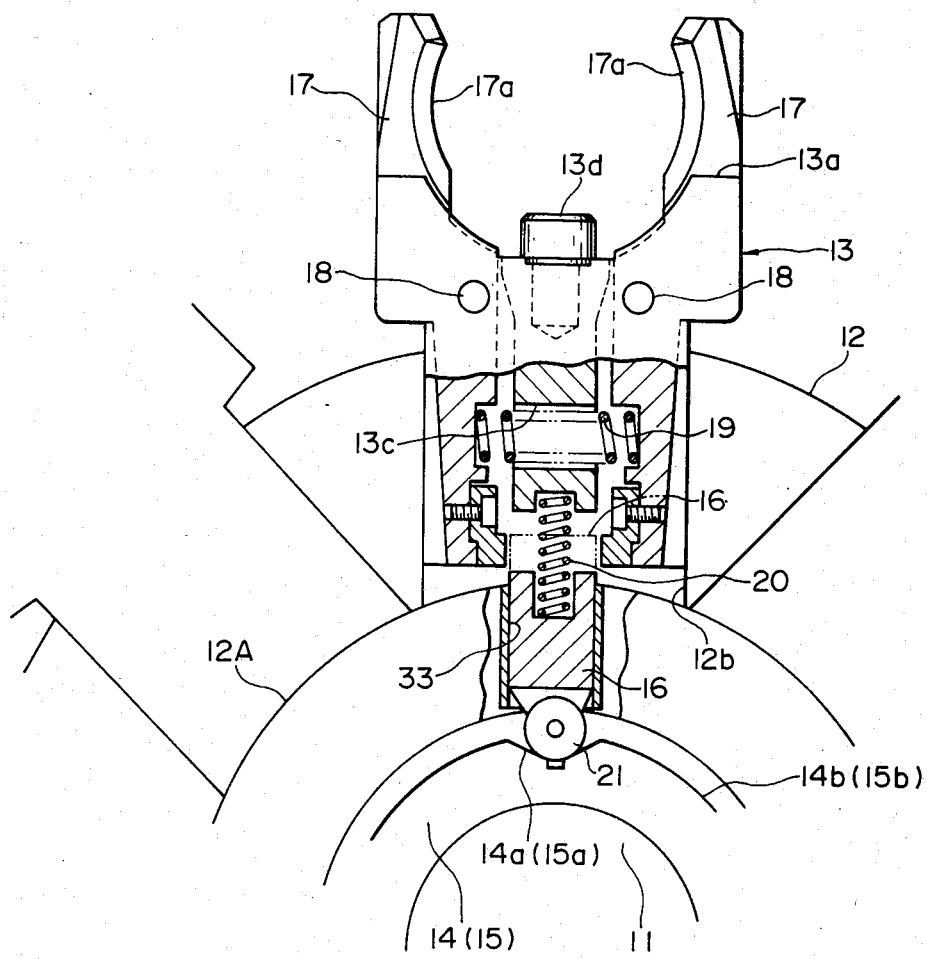
FIG. 3 is a partly sectioned front view of the tool holding mechanism according to the invention.

FIGS. 2 to 4 show an embodiment of the magazine 5 for replaceable tool. The magazine 5 is composed of a pair of magazine units 7 and 8 integrally coupled to each other by a body 6. The tool magazine 5 is fixed through a stopper ring 25 onto a center shaft 11 supported by a pair of bearings 9 and 10 provided at the upper ends of the respective frames F1 and F2 fixed to the tool pallet F, such that the tool magazine 5 is displaceable in the axial direction of the center shaft 11, and rotatable in the circumferential direction. Alternatively, the center shaft 11 is fixed to the frames F1,F2 at 10, and the supporter 12 is provided rotatable about the center shaft 11 at 25, to thereby permit the magazine units to be rotatable about the shaft 11. Each of the magazine units 7 and 8 is provided with a plurality (eight in the drawing) of tool holding mechanisms 13 spaced equidistantly about the outer periphery of a disc-like supporter 12 and provided with lock members 16 disposed at the inner periphery of the supporter 12 at the positions corresponding to the tool holding mechanisms 13 such that the lock members 16 are movable along the outer periphery of a guide ring 14 (15) fixed on the inner end surface of a boss 9a (10a) of the bearing 9 (10). Each of the tool holding mechanisms 13 is constituted by a claw holder 13a, a rear surface portion of which is fitted into a corresponding one of a plurality of grooves 12 radially formed in the outer end surface of the respective disc-like supporter 12 and which is fixed to the supporter 12 by bolts or the like; a pair of claws 17 and 17, the respective root end portions of which are received in a groove 13b of the claw holder 13a and supported by the claw holder 13a so as to be rotatable about a pivotal axis 18. Each of the claws 17, 17 is provided at the forward end of its inner periphery with a circular arc protrusion 17a. A spring 19 held in a hole 13c is formed in the claw holder 13a and sandwiched between the respective root portions of the claws 17 and 17 so as to urge the claws 17 and 17 in a direction to close their respective forward ends. A key 13d is disposed between the respective forward end portions of the pair of claws 17 and 17 and is fixed to the claw holder 13a such that if a tool 3 is pushed into the gap between the half-ring claws 17 and 17 from their forward ends, the pair of claws 17 and 17 pivot about their respective pivotal axis 18 and 18 against the spring force of the spring 19 so that the respective protrusions 17a and 17a are respectively fitted into holding grooves 3a formed in the tool 3 so that the tool 3 is securely held by the claws. The lock member 16 is axially slidably inserted into a corresponding one of a plurality of holes 33 formed in a ring 12a, which is fixed on the inner periphery side of the outer end surface of the supporter 12, at the respective portions of the ring 12a corresponding to the positions of the claws 17, so that the lock member 16 is urged toward the center of the center shaft 11 by a compression spring 20 inserted between the lock member 16 and the claw holder 13a so as to be rotated together with the supporter 12 to cause the inner end portion (correctly, a positioning roller 21 provided at the inner end portion) of the lock member 16 to fall into a positioning groove 14a (15a) formed in the guide ring 14 (15) at the portion of the guide ring corresponding to the index position of the replaceable magazine 5 to make the outer end portion come out from between the root portions of the respective claws 17 and 17 of the tool holding mechanism 13 to thereby allow the claws 17 and 17 to freely move to open their forward ends on one hand, and when the magazine unit 7 (8) rotates relative to the guide ring 14 (15) the above-mentioned positioning roller 21 provided at the outer periphery of the guide ring 14 (15) is pressed by a camming portion 14b (15b) formed on the outer periphery of the guide ring 14 (15) so as to cause the outer end portion of of the lock member 16 to enter the portion between the root portions of the respective claws 17 and 17 as shown by two-dotted chain line in FIG. 3 to thereby prevent the claws 17 and 17 from rotating in the direction to open the forward ends of the claws 17 and 17.

The pair of magazine units 7 and 8 are urged to move to the right in FIG. 2 by a compression spring 22 provided between the supporter 12 and the guide ring 14 of the magazine unit 7 (one of the pair of magazine units at the left side in FIG. 2) so that fixed pins 23 formed on the ring 12A fixed on the supporter 12 of the magazine unit 8 (the other magazine unit at the right side in FIG. 2) are caused to enter fixed holes 24a equidistantly formed in an intervention member 24 fixed to the boss 10a of the bearing 10 and the guide ring 15 in the same number (sixteen in the illustrated embodiment) as that of the tool holding mechanisms 13 of the pair of magazine units 7 and 8 to thereby prevent the pair of magazine units 7 and 8 from freely rotating around the center shaft 11.

The pair of magazine units 7 and 8 are supported on the center shaft 11 such that the respective phases of the total holding mechanisms of the respective magazine units 7 and 8 are shifted by a half pitch from each other as shown in FIG. 4. The above-mentioned fixed pins 23 and the fixed holes 24a are arranged such that the pair of magazine units 7 and 8 can be fixed to the frame F2 at every half pitch so as to constitute a positioning mechanism for positioning the respective tool holding mechanisms 13 of the respective magazine units 7 and 8 into predetermined index positions (the central upper end position of each of the magazine units 7 and 8 in this embodiment). Each of the tool holding mechanisms 13 are attached to the outer periphery of the supporter 12 such that the top ends of the respective claws through or out-of which the tool 3 is to be inserted/removed are disposed outward and the pivotal plane in which the respective claws are pivoted about the pivotal axes 18 (the plane perpendicular to the plane of paper in FIG. 2) is made parallel with the supporter 12. A housing 12B is fixedly attached to the one supporter 12 (for the magazine unit 8) which is fixed to the center shaft 11 by the stopped ring 25 which is in turn fittingly attached to the housing unit 12B. A slip key 26 is fixed to the ring 12A and the tip end of the slip key 26 is inserted into a key slot 27 to prevent the circumferential rotation of the lock member 16. The outer end surface of the supporter 12 is in contact with the guide ring 15 to thereby prevent excessive movement of the magazine units 7 and 8 in the rightward direction in FIG. 2.

The operation of the magazine for replaceable tool according to the present invention will be described next.

A tool 3 from a tool station is held in a predetermined one of the tool holding mechanisms 13 of the magazine 5 mounted on the tool pallet F. The tool pallet number (replaceable tools magazine number), the tool number in the magazine 5 and the tool code (a unique code is allotted to each tool) are stored in a computer for controlling the machine tool. The tool pallet F is placed in its stand-by state at a pallet storage location until a replacement command is issued from the computer.

When a replacement command is issued in accordance with the working schedule, the tool pallet F on which the magazine 5 is mounted is put on the remotely controlled truck D, conveyed to the automatic pallet changer C of a machine tool A, and pulled into the automatic pallet changer C together with the magazine 5. In the case where the machine tool is operating, the tool pallet F is placed on standby in the automatic pallet changer C.

When the machine tool A has completed its operation, the tool pallet F is moved onto the rotary table B of the machine tool A and arranged such that the magazine unit 7 side is directed to the spindle 4 and at the same time the center of the magazine 5 is in registration with the Y-axis of the machine tool controlling axes (the plane in which the spindle undergoes vertical movement). Simultaneously with the above-mentioned operation, a tool 3 which has thus far been held by the spindle 4 is moved to the tool magazine 1 by the tool changer 2.

When the tool pallet F has been moved onto the rotary table B in the manner described above, the spindle 4 comes down along its Y-axis and stops at the position in which the center of the spindle 4 agrees with the center of a replaceable tool 3 disposed at the uppermost position in the magazine 5. The chuck of the spindle 4 is now opened. Then the spindle 4 advances along the Z-axis and takes a replaceable tool 3 which has been held by the tool holding mechanism 13 placed at the uppermost position of the magazine unit 7. At this time the claws 17 and 17 of the tool holding mechanism 13 are pivoted about the pivotal axes 18 and opened against the spring 19 so as to permit the tool 3 to be removed therefrom. Then spindle 4 which has held the replaceable tool 3 comes up along the Y-axis. Thereafter, the tool changer 2 operates in the conventional manner to cause the replaceable tool 3 which has been taken out of the magazine 5 and held by the spindle 4 to be mounted onto the tool magazine 1. The replaced tool which has been mounted on the tool magazine 1 is removed therefrom and held by the spindle 4.

The spindle 4 which is now holding the replaced tool advances along the Z-axis to a position directly above the empty tool holding mechanism 13 (from which the above-mentioned replaceable tool has been taken out) of the magazine unit 7 and then comes down along the Y-axis to push the replaced tool into the portion between the claws 17 and 17 so as to cause the protrusions 17a and 17a to enter the holding grooves 3a causing the tool holding mechanism 13 to hold the replaced tool. At this time the key 13d for preventing the rotation of the tool holding mechanism 13 is fittingly inserted into the key groove formed in the replaced tool at its flange portion. When the replaced tool has been held by the tool holding mechanism 13, the lock which has so far prevented circumferential rotation of the spindle 4 is released so as to allow the spindle 4 to move backward with the replaced tool which is held by the chuck of the spindle 4 and which is inserted into the tool holding mechanism 13 so that the magazine units 7 and 8 are moved in the direction along the center shaft 11 against the compressin spring 22 to pull out the fixed pin 23 from the fixed hole 24a to thereby cause the magazine units 7 and 8 to freely rotate circumferentially. The above-mentioned displacement of the magazine units 7 and 8 by the spindle 4 is performed through the replaced tool which cannot be pulled out of the tool holding mechanism 13 when the spindle 4 moves backward along the Z-axis since the protrusions 17a are fittingly inserted into the holding grooves 3a of the replaced tool.

The spindle 4, which has moved back with the replaced tool held by the chuck thereof so as to pull out the fixed pin 23 from the fixed hole 24a, laterally moves along the X-axis while moving down along the Y-axis (actually, a table base G moves along the X-axis so that the spindle moves along an arc with a radius equal to the distance between the center of the center shaft 11 and the center of the replaced tool) to cause the magazine 5 to pivot about the center shaft 11 to thereby index the next tool into the take-out position. At this time the positioning rollers 21 which have been so far fitted in the positioning grooves 14a and 15a of the guide rings 14 and 15 respectively are removed out of the positioning grooves 14a and 15a and urged by the camming portions 14b and 15b to push the lock members 16 upward (see FIG. 3) against the spring force of the compression springs 20, so that the outer end portion (the upper end portion in FIG. 2) of the respective lock member 16 is inserted into the portion between the roots of the pair of claws 17 and 17 to thereby prevent the top ends of the claws 17 and 17 from being inadvertently opened which would allow the removal of the replaced tool during the rotation of the magazine units 7 and 8. At the newly-indexed tool take-out position, the next one of the positioning rollers 21 enters each of the positioning grooves 14a and 15a so as to temporarily hold the magazine units 7 and 8 at those positions at that time. At this time, the outer end portion of the respective lock member 16 comes out of the portion between the roots of the pair of claws 17 and 17 so that the claws 17 and 17 are released from their locked state to enable a replaceable tool to be taken out from the top portions of the claws 17 and 17.

Having placed the next replaceable tool at its take-out position through the accurate movement, the spindle 4 advances along the Z-axis to insert the fixed pin 23 into the fixed hole 24a. That is, the magazine units 7 and 8 are moved to the right in FIG. 2 by the movement of the spindle 4 in the Z-axis direction and by the compression spring 22 so as to insert the fixed pins 23 into the fixed holes 24a so that the circumferential free rotation of the magazine units 7 and 8 are prevented. Then the spindle 4 moves back along the Z-axis with the chuck unchanged.

Thus, the replacement of one tool is completed. In the case where a plurality of tools are replaced, the above-mentioned operation is repeated. When the tool in the magazine unit 8 is to be replaced, the rotary table B is rotated 180 degrees so as to direct the magazine unit 8 toward the spindle 4 and then the tool replacement is performed in the manner previously described herein. In this case, however, the spindle 4 advances to pull out the fixed pins 23 from the fixed holes 24a.

In the case where a plurality of tools each of the same weight are received in each of the magazine units 7 and 8 and where no excessive angular movement is imparted to each of the magazine units 7 and 8, the main positioning mechanism composed of the fixed pins 23 and the fixed holes 24a can be omitted because the respective positioning rollers 21 of the lock members 16 and the respective positioning grooves 14a and 15a of the rings 14 and 15 weakly fix the magazine units 7 and 8 to the frame F2 to attain the function of the indexing/positioning mechanism for the tool holding mechanisms.

FIG. 5 shows another positioning mechanism in place of the fixed hole 24a and the fixed pin 23. In FIG. 5, a cylinder member 28 provided with two holes 28a and 28b disposed in the shape of T is fixed to each of the bearing bosses 9a and 10a. A fixed pin 29 provided at its top end with a roller 29a and at its center portion with a pressure receiving protrusion 29b is inserted into the hole 28a and biased toward the roller 29a (toward the supporter 12) by a spring 30 and a pressure applying pin 31 provided at its upper end with a roller 31a and at its lower end with a pressure applying slope surface 31b is inserted into the hole 28b and biased upward by a spring 32, so that when the spindle 4 comes down to move down the pressure applying pin 31, the pressure applying slope surface 31b pushes the pressure receiving protrusion 29b to urge the fixed pin 29 leftward in FIG. 5 against the spring force of the spring 30 to thereby cause the roller 29a to remove itself from a fixed groove 12a formed in the supporter 12 so as to release the lock of the magazine 5.

Although the accurate movement of the spindle 4 is transmitted to the magazine 5 through a tool so as to index the tool at a predetermined position in the above-mentioned embodiment, tool indexing may be alternatively attained by causing the magazine 5 to move forward/backward, left/right or up/down movement through the rotation of the spindle 4 through another member or transmission mechanism.

In the above description, the present invention is applied to a machine tool provided with an automatic tool exchanging apparatus of the type in which the tool exchange is conventionally performed between the tool magazine 1 and the spindle 4 by the tool changer 2. The invention is not, however, limited to that case but may be applied to a machine tool provided with an automatic tool exchanging apparatus of the type in which the tool exchange is conventionally performed between the tool magazine 1 and the spindle 4 without using the above-mentioned tool changer 2.

As described above, the magazine for replaceable tool according to the present invention is arranged such that magazine units 7 and 8 each provided at its outer periphery with a plurality of tool holding mechanisms 13 are attached to a center shaft 11, supported by frames F1 and F2 of a tool pallet F, so that the magazine units 7 and 8 may be rotated by utilizing the available degrees of movements, such as movement along X-, Y-, or Z-axes, of a spindle 4 of a machine tool, to thereby index tools at predetermined positions, whereby the tool indexing can be performed rapidly and accurately without requiring any special tool indexing means and any driving means. Further, the magazine for replaceable tool according to the present invention is advantageous in that the pair of magazine units 7 and 8 are disposed with a predetermined distance therebetween, with the respective tool holding mechanisms 13 shifted in phase by half pitch from each other between the magazine units 7 and 8 so that any tool held in any one of the tool holding mechanisms 13 of the magazine unit 7 cannot interfere with any tool held in any one of the tool holding mechanisms 13 of the magazine unit 8 to thereby enable numbers of long tools to be held. Furthermore, a positioning mechanism is provided between the respective magazine unit and the frame so that the respective magazine unit can be accurately stopped at a predetermined position so that the tool insertion/removal operation, into/out-of the respective magazine unit can be safely and accurately performed by the spindle.

What is claimed is:

1. A magazine for replaceable tools comprising:
   (a) a frame (F1, F2) mounted on a tool pallet (F) adapted to be fed to a rotary table of a machine tool;
   (b) a pair of magazine units (7, 8) each comprising a supporter (12) and a plurality of tool holding mechanisms (13) supported on an outer peripheral portion of said supporter (12), said pair of magazine units being rotatably supported relative to a center axis extending through said frame (F1, F2), said magazine units (7, 8) being spaced from each other with a predetermined distance therebetween in the direction of said center axis, a respective tool holding mechanism (13) of one of the magazine units (7, 8) being offset by half a pitch in phase relative to a respective tool holding mechanism of the other magazine unit (8, 7), each of said tool holding mechanisms (13) of a magazine unit comprising means for holding a tool such that it faces a direction opposite the facing direction of tools in tool holding mechanisms of the other magazine unit and in such a manner that the longitudinal axis of the tool extends in parallel with said center axis and means for permitting the tool to be inserted thereinto or released therefrom in a direction perpendicular to the center axis; and,
   (c) a positioning mechanism disposed between said magazine units (7, 8) and said frame (F1 F2) to position each of said tool holding mechanisms (13) of each of said magazine units into a predetermined index position.

2. The magazine of claim 1, wherein said supporter (12) is fixed on a central shaft (11) rotatably supported on said frame (F1 F2), whereby each of said magazine units (7, 8) is provided rotatable about said center axis.

3. The magazine of claim 1, wherein said supporter (12) is rotatably provided on said central shaft (11) fixed to said frame (F1 F2), whereby each of said magazine units is rotatably provided about said center axis.

4. The magazine of claim 2 or 3, wherein each of said tool holding mechanisms comprises a plurality of claw holders (13a) disposed with a predetermined distance between one another on an outer peripheral portion of said supporter (12); and corresponding pairs of claws (17) each pair being pivotally supported by corresponding claw holders (13a), each of said pairs of claws (17) being pivotable in a plane parallel with said supporter (12) to hold the tool, and having free ends directed outwardly of said supporter (12) to allow insertion and release of said tool.

5. The magazine of claim 2 or 3, wherein each of said supporters (12) of each of said magazine units (7,8) is of disc shape and extending perpendicular to said central shaft (11), said supporters being integrally connected together by a cylindrical body (6) so that these supporters are spaced at a predetermined distance from each other in longitudinal direction of said central shaft (11).

6. The magazine of claim 1, wherein said positioning mechanism comprises a first positioning means disposed on said frame (F1 F2), and a second positioning means disposed on said supporter (12) to co-operate with said first positioning means, said positioning mechanism being adapted to lock said magazine units (7,8) with said frame (F1 F2) and to release the locking to allow rotation of said magazine units (7,8).

7. The magazine of claim 6, wherein the numbers of locking positions of said magazine units is equal to the total numbers of said tool holding mechanisms (13), said locking positions being positioned at half pitch intervals between neighboring tool holding mechanisms.

8. The magazine of claim 7, wherein said first positioning means includes fixed holes (24a) having the numbers equal to that of said tool holding mechanisms, and said second positioning means includes a pin (23) releasably engaged with one of said fixed holes.

9. The magazine of claim 6, wherein said positioning mechanism comprises spring biasing means (22) positioned between said frame and one of said magazine units for biasing said magazine units in a direction of said center axis, to thereby provide engagement between said first and second positioning means, to thus maintain said magazine units in their locked positions with respect to said frame; and releasing means adapted to move said magazine unit in a direction of said center axis against the biasing force of said spring biasing means (22) to provide disengagement between said first and second positioning means, to thereby release magazine units from their locked position.

10. The magazine of claim 9, wherein said releasing means includes a spindle (4) of a machine tool.

11. The magazine of claim 6, wherein said second positioning means provides grooves (12a) formed on said supporter (12), said grooves (12a) having the numbers equal to the total numbers of said tool holding mechanisms (13), and said first positioning means includes a pin (29) releasably engageable with one of said grooves (12a).

12. The magazine of claim 11, wherein said first positioning means further comprises a hollow T-shaped cylindrical member (28) fixed on said frame; a pin (29) disposed slidable in said cylindrical member (28) and having a pressure receiving protrusion (29b) integral therewith; a first spring member (30) for biasing said pin (29) toward said supporter (12) to insert a tip end of said pin (29) into said groove (12a); a pressure applying pin (31) slidably disposed in said cylindrical member (28) and extending perpendicular to said pin (29), said pressure applying pin (31) providing a sloping surface (31b) at its tip end abuttable on said pressure receiving protrusion (29b); a second spring member (32) disposed around said pressure applying pin (31) for biasing the pin (31) toward a direction away from said protrusion (29b); and pressure means to urge said pressure applying pin (31) in the axial direction thereof, axial movement of said pin (31) moving said protrusion (29b) to move said pin (29) toward a direction away from said groove (12a) against the biasing force of said spring (30), whereby said supporter (12) becomes rotatable.

13. The magazine of claim 12, wherein said pressure means is a spindle head of a machine tool.

14. The magazine of claim 4, wherein each of said tool holding mechanisms further comprises a locking mechanism, said locking mechanism cooperating with the corresponding pair of claws (17) to release the locking state of said tool holding mechanism at a predetermined index position of said magazine units and to maintain the locking state thereof at other rotational positions of said magazine units.

15. The magazine of claim 14, wherein said locking mechanism comprises a plurality of locking members (16) each being provided with respect to each of said tool holding mechanisms (13); a guide ring (14, 15) provided with respect to each of said magazine units (7,8) and being supported on said frame (F1 F2), each of said guide rings (14 15) forming a positioning groove (14a 15a) at a position corresponding to said index position of said magazine units; and a plurality of springs (20) provided in each of said magainze units to normally urge each of said locking members (16) toward said each of guide rings (14 15), each of said locking members (16) having one end inserted into said positioning groove (14a 15a) when said tool holding mechanism (13) is at a predetermined index position, and the other end being thereby released from the ends of said pair of claws (17) opposite the free ends thereof to release the locking state on a tool maintained by said claws when a locking member (16) is inserted into a positioning groove, and said one end of said locking member (16) pressing on a portion of an outer peripheral surface of said guide ring (14 15) other than said positioning groove when said tool holding mechanism (13) is offset from its index position to permit the other end of said locking member to be engageable with the ends of said pair of claws (17) opposite the free ends thereof to therey maintain a locking state on a tool maintained by said claws.

16. The magazine of claim 15, wherein said locking mechanism of said magazine unit is constructed by said plurality of locking members (16), said pair of guide rings (14 15) and said plurality of springs (20), there being a locking member (16) associated with each of said tool holding mechanisms (13).

17. A magazine for replaceable tools comprising:
(a) a frame (F1 F2) mounted on a tool pallet (F) adapted to be fed to a rotary table of a machine tool;
(b) a pair of magazine units (7, 8) each comprising a supporter (12) and a plurality of tool holding mechanisms (13) supported on an outer peripheral portion of said supporter (12), said pair of magazine units being rotatably supported relative to a center axis extending through said frame (F1, F2), said magazine units (7, 8) being spaced from each other with a predetermined distance therebetween in the direction of said center axis, a respective tool holding mechanism (13) of one of the magazine units (7, 8) being offset by half a pitch in phase relative to a respective tool holding mechanism of the other magazine unit (8, 7), each of said tool holding mechanisms (13) comprising means for holding a tool in such a manner that the longitudinal axis of the tool extends in parallel with said center axis and means for permitting the tool to be inserted thereinto or released therefrom in a direction perpendicular to the center axis; and,
(c) a positioning mechanism disposed between said magazine units (7, 8) and said frame (F1 F2) to position each of said tool holding mechanisms (13) of each of said magazine units into a predetermined index position;
(d) wherein said supporter (12) is fixed on a central shaft (11) rotatably supported on said frame (F1 F2), whereby each of said magazine units (7, 8) is provided rotatable about said center axis;
(e) wherein each of said tool holding mechanisms comprises a plurality of claw holders (13a) disposed with a predetermined distance between one another on an outer peripheral portion of said supporter (12); and corresponding pairs of claws (17) each pair being pivotally supported by corresponding claw holders (13a), each of said pairs of claws (17) being pivotable in a plane parallel with said supporter (12) to hold the tool, and having free ends directed outwardly of said supporter (12) to allow insertion and release of said tool;
(f) wherein each of said tool holding mechanisms further comprises a locking mechanism, said locking mechanism cooperating with the corresponding pair of claws (17) to release the locking state of said tool holding mechanism at a predetermined index position of said magazine units and to maintain the locking state thereof at other rotational positions of said magazine units; and (g) wherein said locking mechanism comprises a plurality of locking members (16) each being provided with respect to each of said tool holding mechanisms (13); a guide ring (14, 15) provided with respect to each of said magazine units (7, 8) and being supported on said frame (F1 F2), each of said guide rings (14, 15) forming a positioning groove (14a, 15a) at a position corresponding to said index position of said magazine units; and a plurality of springs (20) provided in each of said magazine units to normally urge each of said locking members (16) toward said each of guide rings (14, 15), each of said locking members (16) having one end inserted into said positioning groove (14a, 15a) when said tool holding mechanism (13) is at a predetermined index position, and the other end being thereby released from the ends of said pairs of claws (17) opposite the free ends thereof to release the locking state on a tool maintained by said claws when a locking member (16) is inserted into a positioning groove, and said one end of said locking member (16) pressing on a portion of an outer peripheral surface of said guide ring (14, 15) other than said positioning groove when said tool holding mechanism (13) is offset from its index position to permit the other end of said locking member to be engageable with the ends of said pair of claws (17) opposite the free ends thereof to thereby maintain a locking state on a tool maintained by said claws.

18. The magazine of claim 17, wherein said locking mechanism of said magazine unit is constructed by said plurality of locking members (16), said pair of guide rings (14, 15) and said plurality of springs (20), there being a locking member (16) associated with each of said tool holding mechanisms (13).

19. A magazine for replaceable tools comprising:
(a) a frame (F1 F2) mounted on a tool pallet (F) adapted to be fed to a rotary table of a machine tool;
(b) a pair of magazine units (7, 8) each comprising a supporter (12) and a plurality of tool holding mechanisms (13) supported on an outer peripheral portion of said supporter (12), said pair of magazine units being rotatably supported relative to a center axis extending through said frame (F1 F2), said magazine units (7, 8) being spaced from each other with a predetermined distance therebetween in the direction of said center axis, a respective tool holding mechanism (13) of one of the magazine units (7, 8) being offset by half a pitch in phase relative to a respective tool holding mechanism of the other magazine unit (8, 7), each of said tool holding mechanisms (13) comprising means for holding a tool in such a manner that the longitudinal axis of the tool extends in parallel with said center axis and means for permitting the tool to be inserted thereinto or released therefrom in a direction perpendicular to the center axis; and,
(c) a positioning mechanism disposed between said magazine units (7, 8) and said frame (F1 F2) to position each of said tool holding mechanisms (13) of each of said magazine units into a predetermined index position;

(d) wherein said supporter (12) is rotatably provided on a central shaft (11) fixed to said frame (F1 F2), whereby each of said magazine units is rotatably provided about said center axis;

(e) wherein each of said tool holding mechanisms comprises a plurality of claw holders (13a) disposed with a predetermined distance between one another on an outer peripheral portion of said supporter (12); and corresponding pairs of claws (17) each pair being pivotally supported by corresponding claw holders (13a), each of said pairs of claws (17) being pivotable in a plane parallel with said supporter (12) to hold the tool, and having free ends directed outwardly of said supporter (12) to allow insertion and release of said tool;

(f) wherein each of said tool holding mechanisms further comprises a locking mechanism, said locking mechanism cooperating with the corresponding pair of claws (17) to release the locking state of said tool holding mechanism at a predetermined index position of said magazine units and to maintain the locking state thereof at other rotational positions of said magazine units; and (g) wherein said locking mechanism comprises a plurality of locking members (16) each being provided with respect to each of said tool holding mechanisms (13); a guide ring (14, 15) provided with respect to each of said magazine units (7, 8) and being supported on said frame (F1, F2), each of said guide rings (14, 15) forming a positioning groove (14a, 15a) at a position corresponding to said index position of said magazine units; and a plurality of springs (20) provided in each of said magazine units to normally urge each of said locking members (16) toward said each of guide rings (14, 15), each of said locking members (16) having one end inserted into said positioning groove (14a, 15a) when said tool holding mechanism (13) is at a predetermined index position, and the other end being thereby released from the ends of said pairs of claws (17) opposite the free ends thereof to release the locking state on a tool maintained by said claws when a locking member (16) is inserted into a positioning groove, and said one end of said locking member (16) pressing on a portion of an outer peripheral surface of said guide ring (14, 15) other than said positioning groove when said tool holding mechanism (13) is offset from its index position to permit the other end of said locking member to be engageable with the ends of said pair of claws (17) opposite the free ends thereof to thereby maintain a locking state on a tool maintained by said claws.

20. The magazine of claim 19, wherein said locking mechanism of said magazine unit is constructed by said plurality of locking members (16), said pair of guide rings (14, 15) and said plurality of springs (20), there being a locking member (16) associated with each of said tool holding mechanisms (13).

21. A magazine for replaceable tools comprising:
(a) a frame (F1, F2) mounted on a tool pallet (F) adapted to be fed to a rotary table of a machine tool;
(b) a pair of magazine units (7, 8) each comprising a supporter (12) and a plurality of tool holding mechanisms (13) supported on an outer peripheral portion of said supporter (12), said pair of magazine units being rotatably supported relative to a center axis extending through said frame (F1, F2), said magazine units (7, 8) being spaced from each other with a predetermined distance therebetween in the direction of said center axis, a respective tool holding mechanism (13) of one of the magazine units (7, 8) being offset by half a pitch in phase relative to a respective tool holding mechanism of the other magazine unit (8, 7), each of said tool holding mechanisms (13) comprising means for holding a tool in such a manner that the longitudinal axis of the tool extends in parallel with said center axis and means for permitting the tool to be inserted thereinto or released therefrom in a direction perpendicular to the center axis; and, (c) a positioning mechanism disposed between said magazine units (7, 8) and said frame (F1, F2) to position each of said tool holding mechanisms (13) of each of said magazine units into a predetermined index position;

(d) wherein said positioning mechanism comprises a first positioning means disposed on said frame (F1, F2), and a second positioning means disposed on said supporter (12) to co-operate with said first positioning means, said positioning mechanism being adapted to lock said magazine units (7, 8) with said frame (F1, F2) and to release the locking to allow rotation of said magazine units (7, 8);

(e) wherein said positioning mechanism further comprises spring biasing means (22) positioned between said frame and one of said magazine units for biasing said magazine units in a direction of said center axis, to thereby provide engagement between said first and second positioning means, to thus maintain said magazine units in their locked positions with respect to said frame; and releasing means including a spindle (4) of a machine tool, adapted to move said magazine unit in a direction of said center axis against the biasing force of said spring biasing means (22) to provide disengagement between said first and second positioning means, to thereby release magazine units from their locked position.

* * * * *